(12) United States Patent
Doron et al.

(10) Patent No.: US 11,582,259 B1
(45) Date of Patent: *Feb. 14, 2023

(54) CHARACTERIZATION OF HTTP FLOOD DDOS ATTACKS

(71) Applicant: RADWARE LTD., Tel Aviv (IL)

(72) Inventors: Ehud Doron, Moddi'in (IL); Koral Haham, Nahariya (IL); David Aviv, Tel Aviv (IL)

(73) Assignee: Radware Ltd., Tel Aviv (IL)

( * ) Notice: Subject to any disclaimer, the term of this patent is extended or adjusted under 35 U.S.C. 154(b) by 0 days.

This patent is subject to a terminal disclaimer.

(21) Appl. No.: 17/456,332

(22) Filed: Nov. 23, 2021

(51) Int. Cl.
  *H04L 9/40* (2022.01)
(52) U.S. Cl.
  CPC ........ *H04L 63/1458* (2013.01); *H04L 63/168* (2013.01)
(58) Field of Classification Search
  CPC ............. H04L 63/1458; H04L 63/0236; H04L 63/1416; H04L 63/1425; H04L 63/168
  See application file for complete search history.

(56) References Cited

U.S. PATENT DOCUMENTS

| | | | |
|---|---|---|---|
| 7,200,105 B1 | 4/2007 | Milliken et al. | |
| 8,122,253 B2 | 2/2012 | Garg et al. | |
| 8,528,086 B1 * | 9/2013 | Aziz ................... | H04L 63/1425 713/193 |
| 8,844,034 B2 | 9/2014 | Lin | |
| 8,881,282 B1 * | 11/2014 | Aziz ..................... | G06F 21/554 726/23 |
| 9,871,810 B1 * | 1/2018 | Miskovic .............. | G06F 21/552 |
| 9,985,982 B1 | 5/2018 | Bartos et al. | |
| 10,178,109 B1 * | 1/2019 | Miskovic ............ | H04L 63/1416 |
| 10,218,725 B2 * | 2/2019 | Kim .................... | H04L 63/1458 |
| 10,728,268 B1 | 7/2020 | Hagen et al. | |
| 10,880,270 B1 | 12/2020 | Rigor et al. | |
| 11,251,975 B1 * | 2/2022 | Wahla ..................... | H04L 63/12 |

(Continued)

FOREIGN PATENT DOCUMENTS

| | | |
|---|---|---|
| CN | 101478540 B | 4/2012 |
| CN | 103701816 B | 7/2017 |
| CN | 111931175 A | 11/2020 |

OTHER PUBLICATIONS

International Search Report and Written Opinion of International Searching Authority for PCT/IB2021/060895, ISA/IL, Jerusalem, Israel dated Jan. 27, 2022.

(Continued)

*Primary Examiner* — Joseph P Hirl
*Assistant Examiner* — Stephen T Gundry
(74) *Attorney, Agent, or Firm* — M&B IP Analysts LLC.

(57) ABSTRACT

A method and system for characterizing application layer flood denial-of-service (DDoS) attacks are provided. The method includes receiving an indication on an on-going DDoS attack directed to a protected entity; generating a dynamic applicative signature by analyzing requests received during the on-going DDoS attack, wherein the dynamic applicative signature characterizes requests generated by an attack tool executing the on-going DDoS attack; and characterizing each incoming request based on the generated dynamic applicative signature, wherein the characterization provides an indication for each incoming request whether a request is generated by the attack tool.

31 Claims, 10 Drawing Sheets

(56) References Cited

U.S. PATENT DOCUMENTS

| | | | |
|---|---|---|---|
| 2003/0145232 A1 | 7/2003 | Poletto et al. | |
| 2004/0250124 A1* | 12/2004 | Chesla | G06F 21/552 |
| | | | 709/224 |
| 2006/0242701 A1 | 10/2006 | Black et al. | |
| 2008/0086434 A1 | 4/2008 | Chesla | |
| 2008/0086435 A1 | 4/2008 | Chesla | |
| 2009/0138592 A1 | 5/2009 | Overcash et al. | |
| 2012/0317306 A1* | 12/2012 | Radinsky | H04L 63/1408 |
| | | | 709/235 |
| 2012/0331553 A1* | 12/2012 | Aziz | H04L 63/145 |
| | | | 726/23 |
| 2013/0042319 A1 | 2/2013 | Lin | |
| 2017/0331577 A1* | 11/2017 | Parkvall | H04B 7/0848 |
| 2017/0331670 A1* | 11/2017 | Parkvall | H04W 52/0274 |
| 2017/0346932 A1* | 11/2017 | Hildebrand | H04L 63/06 |
| 2018/0026994 A1 | 1/2018 | Han et al. | |
| 2019/0020671 A1 | 1/2019 | Komárek et al. | |
| 2019/0158533 A1 | 5/2019 | Holloway et al. | |
| 2019/0207973 A1 | 7/2019 | Peng | |
| 2020/0067946 A1 | 2/2020 | Han et al. | |
| 2020/0112571 A1* | 4/2020 | Koral | G06N 3/08 |
| 2020/0175161 A1 | 6/2020 | Giaconi | |
| 2020/0285737 A1 | 9/2020 | Kraus et al. | |
| 2020/0364295 A1 | 11/2020 | Nigam et al. | |
| 2020/0412750 A1 | 12/2020 | Doron et al. | |
| 2021/0092158 A1 | 3/2021 | Zhao et al. | |
| 2021/0099482 A1* | 4/2021 | Doron | H04L 63/1425 |
| 2021/0273865 A1* | 9/2021 | Jing | H04L 43/10 |
| 2021/0279354 A1* | 9/2021 | Gandhi | G06F 11/3034 |
| 2022/0019901 A1* | 1/2022 | Saleh | H04L 9/50 |
| 2022/0027348 A1* | 1/2022 | Manevich | H04L 9/0643 |
| 2022/0027803 A1* | 1/2022 | Irazabal | H04L 63/04 |
| 2022/0086179 A1 | 3/2022 | Levin et al. | |
| 2022/0103453 A1* | 3/2022 | Novotny | H04L 43/50 |
| 2022/0150073 A1* | 5/2022 | Androulaki | G16H 10/40 |
| 2022/0318259 A1* | 10/2022 | Gandhi | G06F 16/2282 |

OTHER PUBLICATIONS

International Search Report and Written Opinion of International Searching Authority for PCT/IB2021/060896, ISA/IL, Jerusalem, Israel dated Feb. 7, 2022.

Krishtal, Vadim. "How NGINX App Protect Denial of Service Adapts to the Evolving Attack Landscape" Jul. 6, 2021. https://www.nginx.com/blog/how-nginx-app-protect-denial-of-service-adapts-to-evolving-attack-landscape/.

Sazman, Yaniv. "NGINX App Protect Denial of Service Blocks Application-Level DoS Attacks" Jul. 6, 2021. https://www.nginx.com/blog/NGINX-App-Protect-Denial-of-Service-blocks-application-level-DoS-attacks?mkt_tok=NjUzLVNNQy030DMAAAF-GuCcl8eRU2sblGnyNYtK5mqWIY-eqtUsAziVy_1-QlhuE0n1lq_vNc5uSusXhRAzmMjn24X_2QdGCqWsfrAUZWn3cklsLXj2Zn_sOCUhQFtkwRY#Challenge_Collapsar_(CC)_attack.

\* cited by examiner

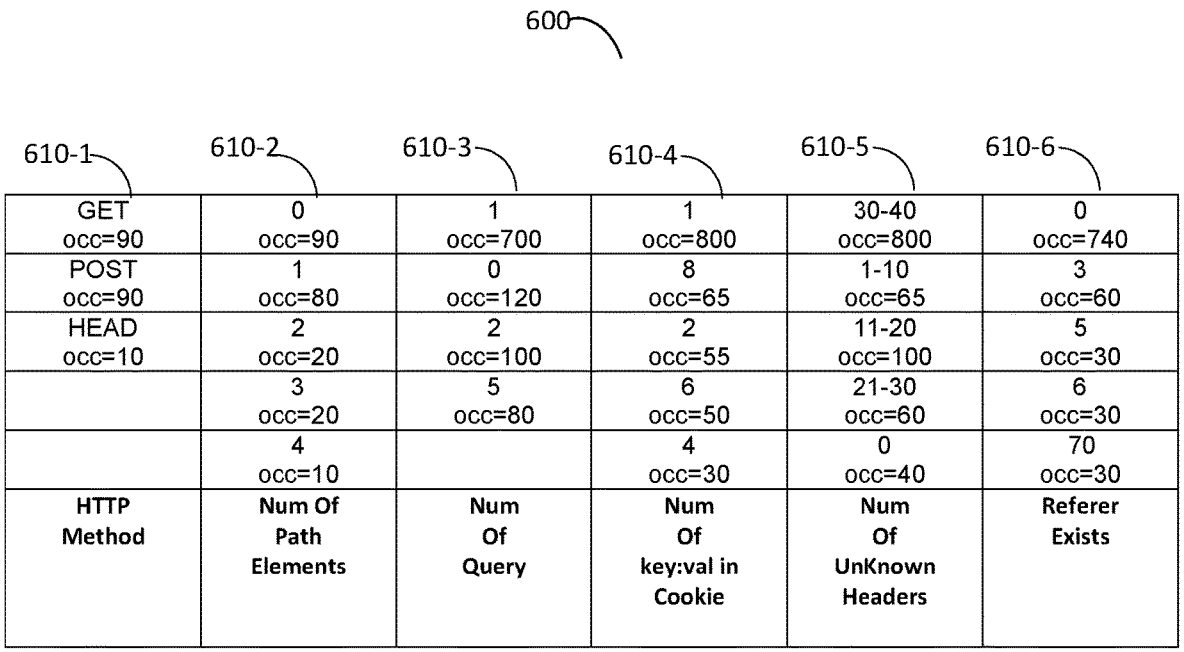

| GET<br>occ=90 | 0<br>occ=90 | 1<br>occ=700 | 1<br>occ=800 | 30-40<br>occ=800 | 0<br>occ=740 |
|---|---|---|---|---|---|
| POST<br>occ=90 | 1<br>occ=80 | 0<br>occ=120 | 8<br>occ=65 | 1-10<br>occ=65 | 3<br>occ=60 |
| HEAD<br>occ=10 | 2<br>occ=20 | 2<br>occ=100 | 2<br>occ=55 | 11-20<br>occ=100 | 5<br>occ=30 |
|  | 3<br>occ=20 | 5<br>occ=80 | 6<br>occ=50 | 21-30<br>occ=60 | 6<br>occ=30 |
|  | 4<br>occ=10 |  | 4<br>occ=30 | 0<br>occ=40 | 70<br>occ=30 |
| HTTP<br>Method | Num Of<br>Path<br>Elements | Num<br>Of<br>Query | Num<br>Of<br>key:val in<br>Cookie | Num<br>Of<br>UnKnown<br>Headers | Referer<br>Exists |

FIG. 6A

| GET | 0 | 1 | 1 | 30-40 | 6 | 0 |
|---|---|---|---|---|---|---|
| HTTP<br>Method | Num of<br>Path<br>Elements | Num of<br>query args | Num of<br>key:val in<br>cookie | Num of<br>known<br>headers | Num of<br>unknown<br>headers | Referer<br>Exists |

FIG. 6B

CHARACTERIZATION OF HTTP FLOOD DDOS ATTACKS

TECHNICAL FIELD

This present disclosure generally relates to techniques for characterization of application-layer denial of service (DoS) based attacks, and specifically for characterizing and mitigating HTTP flood DDoS attacks.

BACKGROUND

These days, online businesses and organizations are vulnerable to malicious attacks. Recently, cyber-attacks have been committed using a wide arsenal of attack techniques and tools targeting both the information maintained by online businesses, their IT infrastructure and the actual service availability. Hackers and attackers are constantly trying to improve their attack strategies to cause irrecoverable damage, overcome currently deployed protection mechanisms, and so on.

One type of popular cyber-attack is a DoS/DDoS attack, which is an attempt to make a computer or network resource unavailable or idle. A common technique for executing DoS/DDoS attacks includes saturating a target victim resource (e.g., a computer, a WEB server, an API server, a WEB application, and the like), with a large quantity of external requests or volume of traffic. As a result, the target victim becomes overloaded, and thus cannot assign resources and respond properly to legitimate traffic. When the attacker sends many applicative or other requests towards its victim service or application, each victim resource would experience effects from the DoS attack. A DDoS attack is performed by controlling many machines and other entities and directing them to attack as a group.

One type of DDoS attack is known as a "DDoS Application Layer DDoS Attack". This is a form of a DDoS attack where attackers target application-layer processes, resources or the applications as a whole. The attack over-exercises specific functions or features of an application to disable those functions or features, and by that makes the application irresponsive to legitimate requests or even terminate or crash. A major sub-class of application layer DDoS attack is the HTTP flood attack.

In HTTP flood attacks, attackers manipulate HTTP, GET, POST, and other unwanted HTTP requests to attack or overload, a victim server, service or application resources. These attacks are often executed by an attack tool or tools designed to generate and send floods of "legitimate-looking" HTTP requests to the victim server. The content of such requests might be randomized, or pseudo-randomized, in order to emulate legitimate WEB client behavior and evade anti-DoS mitigation elements. Examples of such tools include Challenge Collapsar (CC), Shaphyra, Mirai botnet, Meris botnet, Akira, Xerxes, WEB stresser, DDoSers, and the like.

Recently, a large number of new and sophisticated tools have been developed by hackers and are now being used in various lethal and very high-volume HTTP flood attacks. The need for very simple and accurate solutions for HTTP flood attack mitigation is becoming actual and urgent. Modern on-line services demand applicative anti-DoS solutions that are required to be able to characterize incoming HTTP requests as generated by an attacker or a legitimate client, all in real-time, with a low false positive rate and a low false negative rate. Attackers keep improving their attack tools by generating "legitimate-looking" HTTP requests, resulting in very challenging mitigation and more specific characterization of applicative attacks.

Characterization of HTTP flood DDoS attacks executed by such tools is a complex problem that cannot be achieved by currently available solutions for mitigating DDoS attacks. Distinguishing legitimate HTTP requests from malicious HTTP requests is a complex and convoluted task. The complexity of the problem results from the fact that there are dozens of attack tools that behave differently and generate different attack patterns. Further, the attack tools send HTTP requests with a truly legitimate structure (e.g., a header and payload as defined in the respective HTTP standard and follow the industry common practices) and with some parts of their requests' contents being randomized. For example, the values of HTTP headers, random query argument keys and values, and so on, can all be randomly selected. Furthermore, since the multitude of requests is high (e.g., thousands or tens of thousands of requests each second) and there is an ever-evolving content of requests, along with the vast usage of randomization, existing DDoS mitigation solutions cannot efficiently characterize HTTP floods application layer DDoS attacks.

Existing solutions are based on calculating the normal baseline during peacetime (when no attack is active or detected), and then any deviation from the baseline is detected as an attack. The baseline is a statistical model calculated or learned over received HTTP requests, representing a normal behavior of a legitimate client accessing the protected server, Upon HTTP flood attack detection, the normal baseline is also used for the actual attacker characterization tasks.

There are a number of disadvantages with HTTP flood mitigation solutions that are based on normal baselines for attack characterization. One disadvantage is that no accurate baseline can be established when the attack is carried out by attacks generating random requests. The entropy of such a request may be too large to baseline. Further, detection of attack using baselines requires setting the threshold to detect an anomaly or deviation from the baseline. Again, the nature of the requests generated by attack tools executing HTTP flood DDoS attacks would require implementing a threshold that has to be dynamically updated. The computation of such thresholds is complex and not always accurate, and thus may lead to a high number of false-positive detections.

Baseline-based HTTP flood attack characterization solutions are also configured to analyze in-line traffic (between a client and protected server) during peace time. Thus, such solutions are not applicable for out-of-path processing of traffic, i.e., when the traffic is directed to the mitigation solution (on-prem device or in the cloud managed service) only upon an on-going attack.

Further, since HTTPS flood attacks employ legitimate-looking requests with or without high volumes of traffic, it is difficult to differentiate such requests from valid traffic. Thus, such types of DDoS attacks are amongst the most advanced non-vulnerable security challenges facing servers and applications owners today.

It would be, therefore, advantageous to provide an efficient security solution for the characterization of HTTPS flood attacks.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Some embodiments disclosed herein include a method for characterizing application layer flood denial-of-service (DDoS) attacks. The method includes receiving an indication on an on-going DDoS attack directed to a protected entity; generating a dynamic applicative signature by analyzing requests received during the on-going DDoS attack, wherein the dynamic applicative signature characterizes requests generated by an attack tool executing the on-going DDoS attack; and characterizing each incoming request based on the generated dynamic applicative signature, wherein the characterization provides an indication for each incoming request whether a request is generated by the attack tool.

Some embodiments disclosed herein include a system for characterizing application layer flood denial-of-service (DDoS) attacks. The system comprises a processing circuitry; and a memory, the memory containing instructions that, when executed by the processing circuitry, configure the system to: receive an indication on an on-going DDoS attack directed to a protected entity; generate a dynamic applicative signature by analyzing requests received during the on-going DDoS attack, wherein the dynamic applicative signature characterizes requests generated by an attack tool executing the on-going DDoS attack; and characterize each incoming request based on the generated dynamic applicative signature, wherein the characterization provides an indication for each incoming request whether a request is generated by the attack tool.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention will be apparent from the following detailed description taken in conjunction with the accompanying drawings.

FIG. 6A is an example array of paraphrase buffers.

FIG. 6B shows the top of buffer (ToB) of the array of FIG. 6.

DETAILED DESCRIPTION

Figure 1:
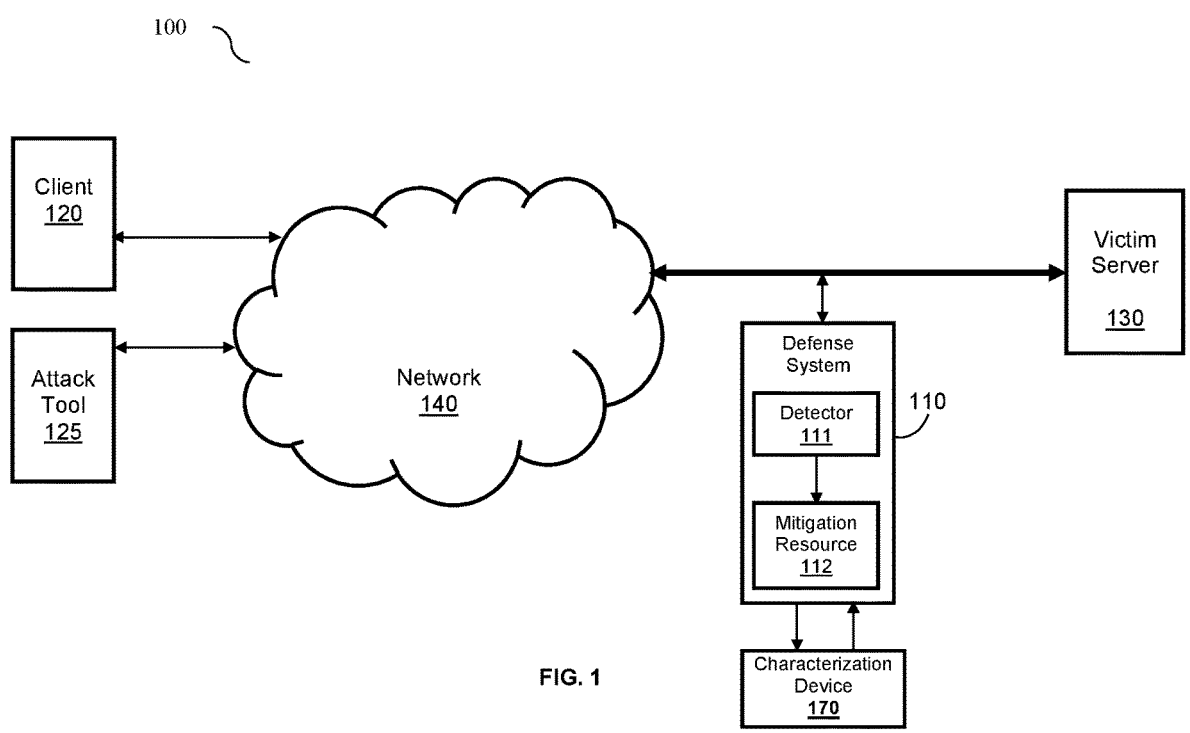
FIG. 1 is a schematic diagram utilized to describe the various embodiments for characterization and mitigating HTTP flood attacks according to some embodiments.

The embodiments disclosed herein are only examples of the many possible advantageous uses and implementations of the innovative teachings presented herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method for the characterization of HTTP flood DDoS attacks. The disclosed method characterizes malicious requests over legitimate requests, to allow efficient mitigation of HTTP floods attacks. The attacks are characterized by generating a dynamic applicative signature (or simply a "signature") of the HTTP requests generated by the attacker executing the attack. In an embodiment, the disclosed method can be performed by a device deployed in an out-of-path deployment. The various disclosed embodiments will be described with a reference to an HTTP flood DDoS attack, but the techniques disclosed herein can be utilized to characterize flood DDoS attacks generated by other types of application layer protocols.

FIG. 1 is a schematic diagram 100 utilized to describe the various embodiments for characterization and mitigating HTTP flood attacks according to some embodiments. In schematic diagram 100, client device 120 and attack tool 125 communicate with a server 130 over a network 140. To demonstrate the disclosed embodiments, the client device 120 is a legitimate client (operated by a real legitimate user, or other legitimate WEB client entities), the attack tool 125 is a client device (operated, for example, as a bot by a botnet), and the server 130 is a "victim server", i.e., a server under attack.

The legitimate client 120 can be a WEB browser, or other type of legitimate WEB application client, and the like executing over a computing device, such as a server, a mobile device, an IoT device, a laptop, a PC, and the like.

The attack tool 125 carries out malicious attacks against the victim server 130, and particularly carries out HTTP flood attacks. The attack tool 125 generates and sends "legitimate-looking" HTTP requests. The attacker's generated HTTP requests having the correct structure and content as required by the HTTP protocol, and by that, these requests look "legitimate" even though they were generated by an attacker with malicious purposes. The attacker makes use of a large amount of randomization or pseudo-randomization. In some cases, the attacker generates a large set of distinct "legitimate" requests while also randomly transmitting the attacking request during selected periods of time. It should be noted that the attacker generates a large number of distinct HTTP requests in order to be able to evade fingerprinting and mitigation by simple WEB filtering, or other means of attack mitigation.

The attack tool 125 may be a HTTP Flood attack tool that can be deployed as a botnet using WEB proxies, or as a HTTP Flood attack tool without using WEB proxies. The attack tool 125 also can be deployed as a WEB stresser, DDoSers, and other "DDoS for hire" forms of attacks.

The attack tool 125 generates requests with a legitimate structure and content. To obtain the "legitimate structure", attacker-generated HTTP requests may include a legitimate URL within the protected application; set of common HTTP headers and contain one, or more, query arguments. The attack tool 125 can constantly include a specific HTTP header, or query arguments, in its generated HTTP requests, or randomly decide to include or exclude them in each generated request or set of requests.

The attack tool 125 generated requests can also contain legitimate and varied content. To make its generated requests to "look" legitimate, the attack tool generated HTTP requests can have HTTP headers with legitimate values (e.g.; UserAgent can be randomly selected from a pre-defined list of legitimate UserAgent, Refere can be randomly selected from a pre-defined list of legitimate and common WEB sites, e.g., facebook.com, google.com).

These overall operations of the attack tool 125 result in a set of tens thousands, or even millions, of distinct attacker's HTTP requests. The attacker uses randomization to select the actual HTTP request to send toward its victim in each request transmission. Therefore; aiming to simply recognize the millions of distinct attacker's requests "as is" will be a very tedious, almost impossible, task. It is important to note that these tools have numerous mutations and variants, but still follow similar operations, and the HTTP requests they generate are as described above. Advanced attack tools are designed to bypass simple Layer-7 filtering for mitigation by generating a large set of distinct and "legitimate-looking" HTTP requests. As such, no dominant, or frequent, set of several HTTP requests can be characterized as issued by the attack tool 125.

Requests generated by the legitimate client device(s) 120 are more diverse in their structure comparing to the attacker's requests. The legitimate client HTTP requests potentially have more HTTP headers, standard and non-standard headers, turn to a plurality of URLs within the protected application 130, have more key-values pairs in Cookie, use more query arguments, and more, Based on the higher diversity and content distribution of legitimate requests, the characterization of such requests is possible.

It should be noted that the embodiments disclosed herein are applied when multiple attack tools execute the attacks against the victim server 130 concurrently. Similarly, a vast number of legitimate client devices 120 can operate concurrently to be delivered with the services proposed by the server 130. Both client device 120 and attack tool 125, also a client device, can reach the victim server 130 concurrently. The network 140 may be, but is not limited to, a local area network (LAN), a wide area network (WAN), the Internet, a cloud network, a cellular network, and a metropolitan area network (MAN), a wireless network, IoT network, or any combination thereof.

According to the disclosed embodiments, a defense system 110 is deployed between client 120, attack tool 125, and victim server 130. The defense system 110 is connected to a characterization device 170 (hereinafter "the device 170 configured to carry out the disclosed embodiments"). Specifically, during an attack, characterization device 170 is configured to characterize requests received from the defense system 110, and built a dynamic applicative signature, or signatures, characterizing the HTTP requests of attack tool 125 (or the attacker). The signature generated by device 170 may allow the selection of a mitigation action or policy. The mitigation action may be carried out by system 110.

An indication of an on-going attack is provided by the defense system 110. The techniques for the detection of ongoing attacks are outside of the scope of the disclosed embodiments. As illustrated in FIG. 1, the defense system 110 and characterization device 170 are deployed out-of-traffic (traffic between the client and victim server), such that during peacetime, the characterization device 170 does not require any kind of access, or awareness, to HTTP, or other, traffic addressed toward to victim server 130.

The defense system 110, characterization device 170, and the victim server 130 may be deployed in a cloud computing platform and/or in an on-premises deployment, such that they collocate together, or in a combination. The cloud computing platform may be, but is not limited to, a public cloud, a private cloud, or a hybrid cloud. Example cloud computing platforms include Amazon® Web Services (AWS), Cisco® Metacloud, Microsoft® Azure®, Google® Cloud Platform, and the like. In an embodiment, when installed in the cloud, the device 170 may operate as a SaaS or as a managed security service provisioned as a cloud service. In an embodiment, when installed on-premise, the device 170 may operate as a managed security service.

In an example configuration, the defense system 110 includes a detector 111 and a mitigation resource 112. The detector 111 in the defense system 110 is configured to provide an indication of an ongoing attack. The mitigation resource 112 is configured to perform one or more mitigation actions, triggered by the detector 111, to mitigate a detected attack. The mitigation resource may be, but is not limited to, a scrubbing center or a DDoS mitigation device. In an embodiment, the defense system 110 and/or the characterization device 170, are integrated together in a DDoS mitigation device. In another embodiment, the defense system 110 and/or the characterization device 170 is a multi-tiered mitigation system. The arrangement, configuration, and orchestration of a multi-tiered mitigation system are disclosed in U.S. Pat. No. 9,769,201, assigned to the common assignee, which is hereby incorporated by reference. In an embodiment, the defense system 110 and/or the characterization device 170, are integrated together in a WAF (Web Application Firewall) device. In yet another embodiment, the defense system 110 and/or the characterization device 170, are integrated together in any form of a WEB proxy or a WEB server. In yet another embodiment, the defense system 110 and/or the characterization device 170 can be integrated into WEB caching systems like CDN and others.

The victim server 130 is the entity to be protected from malicious threats. The server 130 may be a physical or virtual entity (e.g., a virtual machine, a software container, a serverless function, and the like). The victim server 130 may be a WEB server (e.g., a server under attack, an on-line WEB server under attack, a WEB application under attack, an API server, a mobile application and so on).

According to the disclosed embodiments, during an active attack, device 170 is configured to inspect applicative transactions received from the defense system 110. The transactions are requests, such as HTTP requests sent to the victim server 130, The transactions are received at the device 170 upon detection of a potential attack by the detector 111 and continued throughout the attack duration. The device 170 is configured to analyze the received transactions and determine if an HTTP request's structure is of the attack tool (125) executing the detected attack, or a legitimate HTTP request sent by client 120. The device 170 reports back its decision on each of the received requests to the defense system 110. The decision can be to mitigate the request or to safely pass the requests to the victim server 130.

That is, to distinguish between legitimate and attacker traffic, the device 170 is configured to examine each incoming HTTP request's structure rather than its content. The HTTP request inspection is done after it has been decrypted from any layer of encryption. The content of a request is the actual values in the requests, such as a URL path, values of various key-value pairs in HTTP request headers, HTTP query argument values and so on. According to the disclosed embodiments, the incoming HTTP requests are represented as a set of paraphrases over incoming HTTP requests, where each paraphrase represents a specific aspect of the HTTP request's structure. As HTTP flood attacks have a significantly larger volume of HTTP requests compared to the volume of the legitimate requests, the device 170 is configured to find the most repetitive structure aspects of the incoming requests, by dynamically calculating the most repetitive paraphrase.

The most repetitive paraphrases characterize the attacker's traffic, as it represents the attacker's requests for "common structure", or "structures" (as was explained above). Based on the repetitive paraphrases, the device 170 is configured to create an attack dynamic applicative signature over the traffic generated by the attack tool 125. The generated attack dynamic applicative signature can be utilized to define and enforce specific mitigation policies and actions over the incoming HTTP requests. To this end, mitigation is performed based on instructions provided by the device 170 to the defense system 110.

In an example embodiment, a mitigation action may be performed, by a mitigation resource 112, selectively on the attacker traffic only. Mitigation action can be a simple blocking of the request, response on behalf of the server 130 with a dedicated blocking page, or similar. In yet another embodiment, the mitigation action may include limiting the traffic or just reporting and logging the mitigation results without any actual blocking of the incoming request.

It should be emphasized that the defense system 110 is configured to determine or to otherwise identify traffic from the attack tool 125 without computing any normal baseline over the traffic. As such, for the attacker traffic characterization activities there is no need to compute any threshold to detect any deviation from the respective baseline(s). This simplifies the process performed by the device 170 over prior art solutions. In addition to that, the characterization device 170 can be deployed in an out-of-path environment, such as a cloud managed service. In an embodiment, these out-of-path managed services are realized such that, only upon attack traffic diversion activities are operated to divert server 130 traffic to the cloud security service, or cloud scrubbing center. The defense system 110, and the characterization device 170, are deployed in the cloud and able to mitigate HTTP floods attacks without any need to inspect the server 130 traffic (get the HTTP traffic, decrypt the traffic and such) during peace time. The elimination of the need to baseline peace time traffic results in an efficient and operable solution.

In the example deployment, not shown in FIG. 1, the defense system 110 may be connected in-line with the traffic between the client device 120 and the attack tool 125 toward the victim server 130. In this deployment, the defense system 110 is configured to process ingress traffic from the client device 120 and the attack tool 125. In the deployment illustrated in FIG. 1, the device 170 is connected out-of-path with the traffic between the client device 120 and the attack tool 125 toward the victim server 130. This is, in such deployment, during peacetime, the device 170 does not inspect every request sent from the client device 120 and the attack tool 125, but only the generated requests forwarded by the system 110 during an attack time.

In some configurations, the defense system 110 is also connected out-of-traffic where traffic is diverted by a switch\router or a WEB proxy (not shown) to processing by the defense system 110. In such configurations, the device 170 is also connected out-of-path.

In yet another configuration, the defense system 110 may be always-on deployment. In such a deployment, the defense system 110 and the device 170 are part of a cloud protection platform (not shown).

In another embodiment, the device 170 is integrated with the defense system 110. In such embodiment, the processing of requests by the device 170 is performed only at the time of the attack, regardless of the deployment of the integrated system. This integrated system can be a DDoS mitigation device, a Web Application Firewall and the like.

It should be noted that although one client device 120, one attack tool 125, and one victim server 130 are depicted in FIG. 1 merely for the sake of simplicity, the embodiments disclosed herein can be applied to a plurality of clients and servers. The clients may be located in different geographical locations. The servers may be part of one or more data centers, server frames, private cloud, public cloud, hybrid cloud, or combinations thereof. In some configurations, the victim server 130 may be deployed in a data center, a cloud computing platform, or on-premise of organization, and the like. The cloud computing platform may be a private cloud, a public cloud, a hybrid cloud, or any combination thereof. In addition, the deployment shown in FIG. 1 may include a content delivery network (CDN) connected between client 120, attack tool 125 and server 130.

System 110 and device 170 may be realized in software, hardware, or any combination thereof. System 110 and device 170 may be a physical entity (example block diagram is discussed below) or a virtual entity (e.g., virtual machine, software container, micro entity, function, and the like).

Figure 2A:
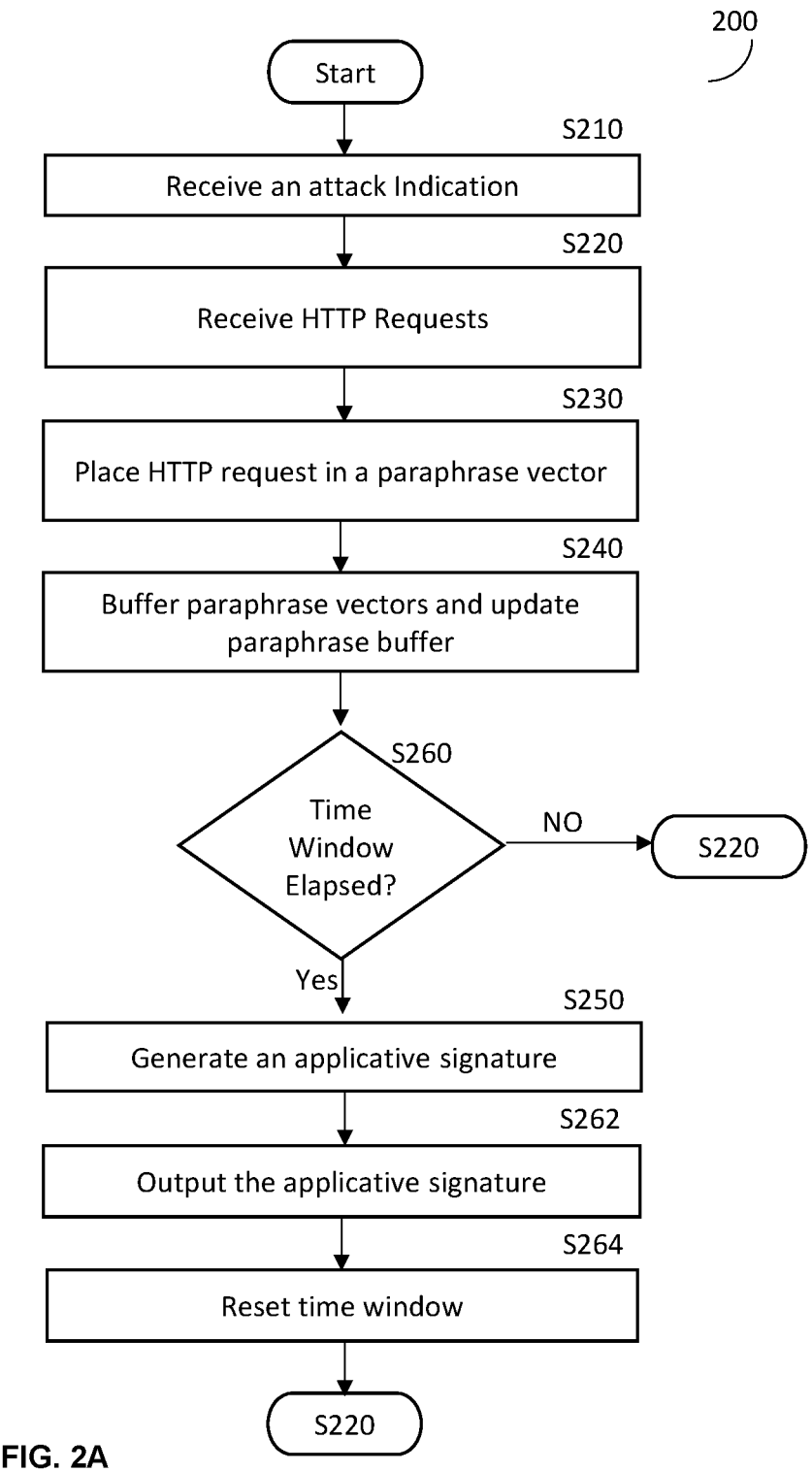
FIGS. 2A and 2B are flowcharts illustrating the characterization of HTTP flood attacks according to an embodiment.
Figure 2B:
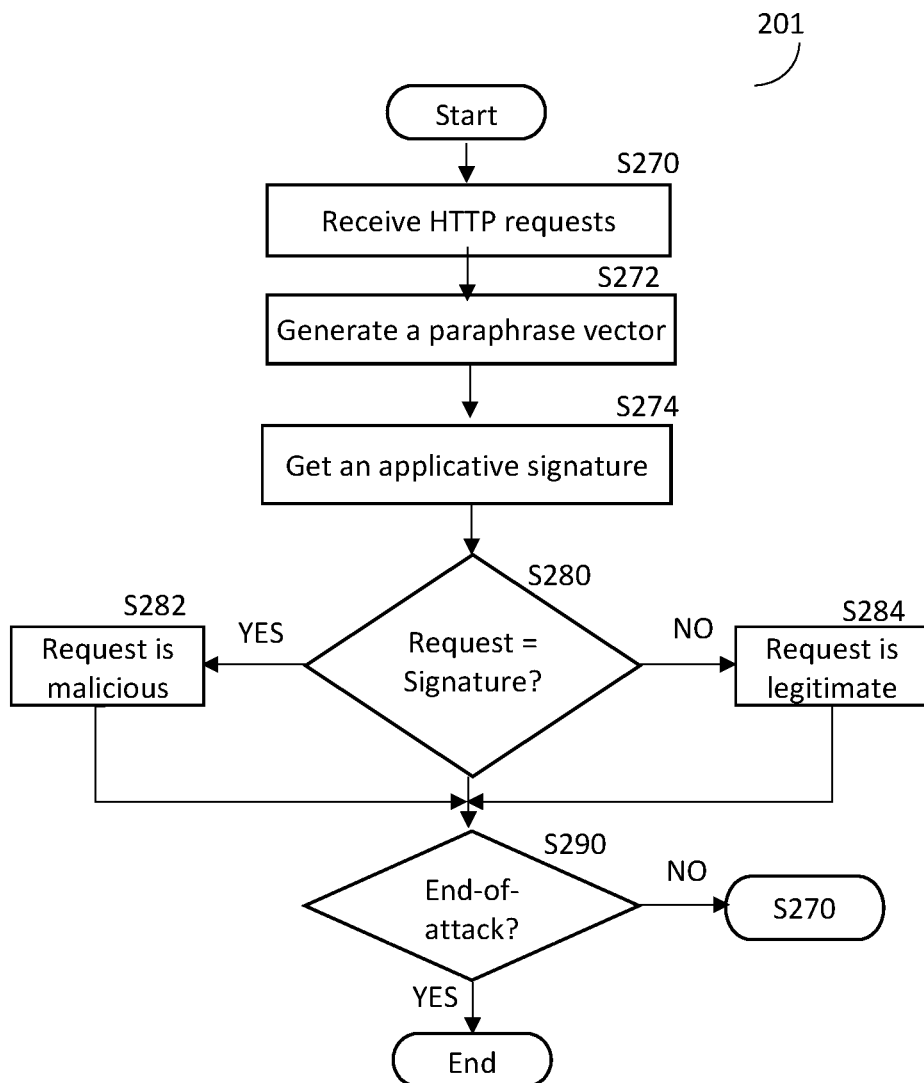

FIGS. 2A and 2B show example flowcharts 200 and 201, respectively illustrating the characterization of HTTP flood attacks according to an embodiment. The method is designed to characterize requests generated by attackers using HTTP Flood tools, such as those mentioned above, and others that were not mentioned. Specifically, FIG. 2A demonstrates the process for generating a dynamic applicative signature based on HTTP requests, and FIG. 2B describes the actual characterization of incoming requests based on the generated dynamic applicative signature. In an example embodiment, the process shown in FIG. 2A is performed as a background process where a new dynamic applicative signature is generated in every predefined time window. The process shown in FIG. 2B operates on the generated dynamic applicative signatures. The processing of incoming requests is performed by both processes (200 and 201) as requests are received.

The characterization is based on learning the structure of incoming HTTP requests, and based on the learned structure, dynamically build a dynamic applicative signature representing the structure of requests generated by an attack tool, or collection of tools working altogether. The signature building is adaptive and capable of learning a vast number of different attack tools. The initial learning is a very short period (less than 10 seconds) during which certain attributes identified by incoming requests are accumulated or buffered. After this setup period, the system is capable of characterizing attacker requests with a low rate of false positive and false negative. Therefore, the characterization of HTTP Flood attacks is performed in real-time as requests are sent to a victim server. It should be emphasized that the entire characterization method (including the short learning setup period) is performed during attack time.

Reference is now made to FIG. 2A. At S210, an indication of an ongoing attack is received. The indication is received from a detection system (e.g., system 110, FIG. 1). The execution of the characterization method begins upon reception of such indication.

At S220, HTTP requests are received during the attack time. In an embodiment, the HTTP requests are diverted, or sent for inspection, from the path to the victim server to the device processing the attack characterization method (e.g., system 170, FIG. 1). The source of the HTTP requests is known, but when received, it has not yet been determined if the source is an attacker (e.g., attack tool 125, FIG. 1) or a legitimate client. Hereinafter, this distinction "if the HTTP request source is an attacker or a legitimate client", is the actual HTTP floods attack characterization which is the main objective of the disclosed embodiments.

At S230, each incoming request is processed and placed in or represented as a respective paraphrase vector. The characterization is based on understating the structure of the requests and not the contents of the request. Such structure representation is referred to here as a paraphrase. A paraphrase vector is a data structure that represents attributes of incoming HTTP requests' structure according to a notation of a respective paraphrase.

In an example embodiment, the following HTTP request attributes are included in a "paraphrase vector" of HTTP request: HTTP VERB (GET, POST, PUT, and such); a number of path elements in the request URL path; a number of query arguments in the request URL; a number of key:values cookie elements in cookie; a length of User Agent header; the total length in bytes of the request; a total number of "known HTTP headers" (standard HTTP headers); and a total number of "unknown headers", i.e., all HTTP headers that are not standard HTTP headers according to any existing standards. The existence, or non-existence, of a pre-defined set of HTTP headers are also included as paraphrases in the system paraphrase vector. This set of specific HTTP headers can be composed from standard or non-standard HTTP headers. In yet another embodiment, the paraphrase vector entities are learned dynamically, to be adaptive to the incoming traffic of a specific application.

In an embodiment, the definition of standard headers, or non-standard headers can be defined dynamically. In yet another embodiment, and in order to adapt to various types of protected applications, the actual HTTP request attributes to be considered as paraphrase and be included in a paraphrase vector, can be defined dynamically, learned over time, and so on. In yet another embodiment, the paraphrase vector entities are dynamically defined by the user operating the system, to be adaptive with the protected application operational, or others, needs.

Figure 3:
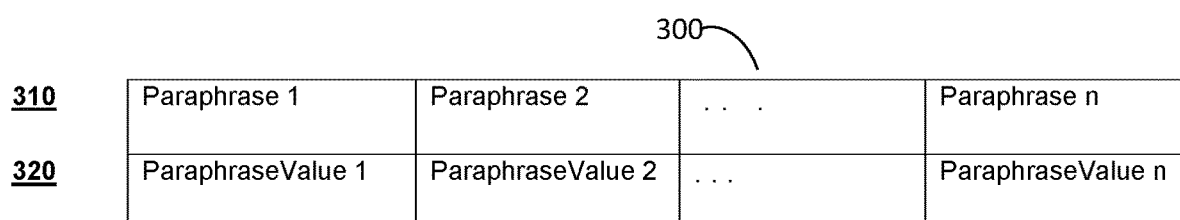
FIG. 3 is an example structure paraphrase vector generated according to an embodiment.

An example paraphrase vector 300 is shown in FIG. 3, where row 320 represents the paraphrase values of the respective paraphrase (attribute) in row 310. The paraphrase value can be either an integer number (e.g., number of cookie elements in the Cookie HTTP header), string (e.g. HTTP method type), or binary (exists or does not exist for a specific HTTP header from a pre-defined list).

Figure 4:
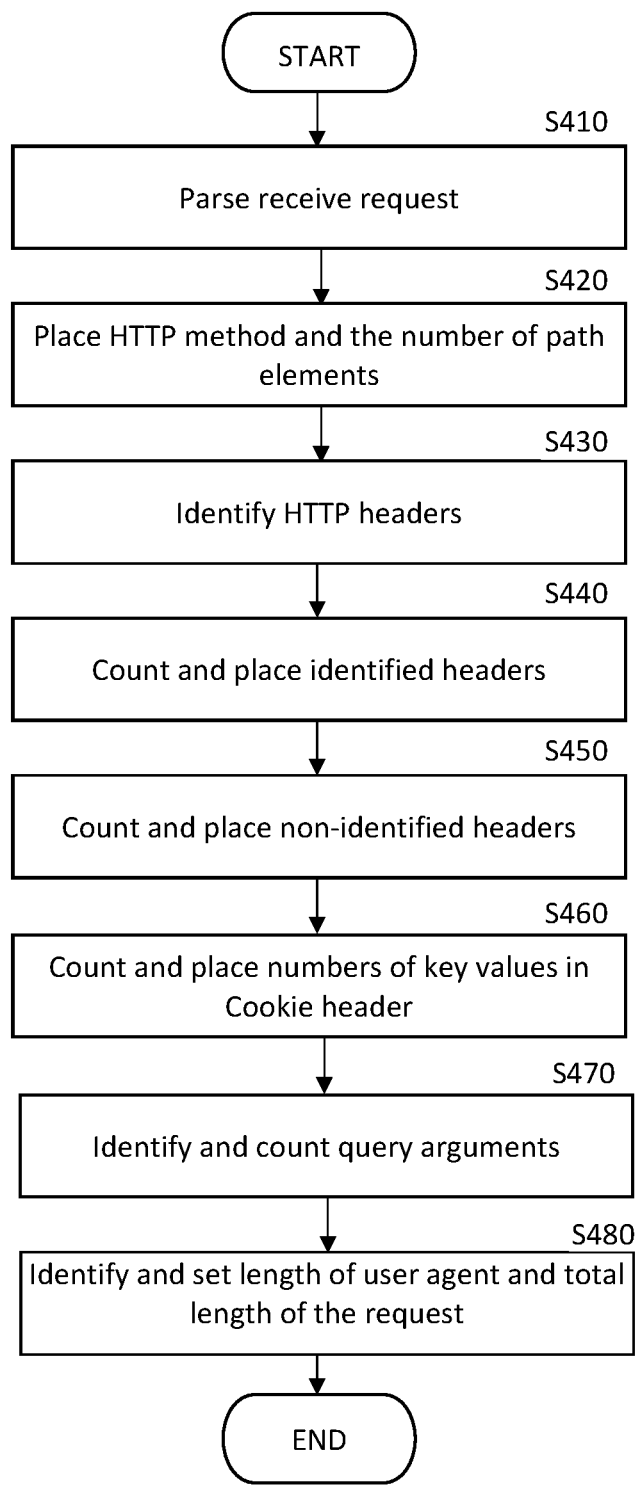
FIG. 4 is a flowchart illustrating the process of generating a paraphrase vector according to an embodiment.

The conversion or placing of values from the received HTTP request in the paraphrase vector depends on the respective attributes. The operation of S230, in FIG. 2A, is now discussed with reference to FIG. 4.

At S410, the received request is parsed. Specifically, the HTTP request's fields headers, and other components, are parsed and processed. At S420, the information in the HTTP method's field is copied from the request into its corresponding "HTTP Method" paraphrase value cell in the vector. The value can be "GET", "POST", or "HEAD", or any other HTTP methods.

At S420, the number of path elements is counted from the URL path designated in the request. Every "\" is counted. For example, for the path "\pictures\images\2021\July\" the value is 4. For the root "\" its paraphrase is 0.

At S430, known HTTP headers are identified in the parsed request. This can be performed by first finding (e.g., using regular expression) all strings designated as known headers. For example, the Accept* paraphrase is built by finding the existences of all HTTP headers starting with 'Accept-*' (e.g., Accept, Accept-Encoding, Accept-Language, and so on). If at least one 'Accept*' header is found in a request, then the paraphrase value is EXIST. Otherwise, the paraphrase value is NOT-EXIST. In an embodiment, the known headers include, yet are not limited to, the following headers: Referer, User-Agent, Host, Authorization, Connection, Cache-Control, Date, Pragma, Expect, Forwarded, From, Max-Forwards, Origin, Prefer, Proxy-Authorization, Range, Transfer-Encoding, Upgrade, Via, Accept* (all HTTP headers that starts with Accept), Content* (all HTTP headers that starts with Content), Sec-(all HTTP headers that starts with Sec-), and If-* (all HTTP headers that starts with If-), and similar HTTP headers, standard, and not standard.

At S440, all identified known headers are counted and the respective value is set as a paraphrase value for the total number of "known HTTP headers". Each appearance of a known header is counted as 1, and the total count of all headers "known HTTP headers" is set accordingly.

At S450, any header that is not identified (e.g., by the above-mentioned regular expression) is counted and added to the respective paraphrase, the total number of unknown headers. If no unknown headers are found, the respective paraphrase value is set to zero.

At S460, any cookie header in the received HTTP request is identified and a number of ley: value in the cookie are counted and added to the respective paraphrase, the total number of key:value in cookie. If no cookie header is found, the respective paraphrase value is set to zero.

At S470, any query arguments in the URL of the received HTTP request is identified and parsed, and the total number of query arguments URL are counted and set at the respective paraphrase, the number of query arguments in the request URL. If no query argument is found the respective paraphrase value is set to zero.

At S480, the User Agent and the total length of the received HTTP request are identified and parsed. Further, the length of User Agent header is counted and set to the respective paraphrase, the length of User Agent header. If no User Agent HTTP header is found, the respective paraphrase value is set to zero. Furthermore, the total length in bytes of the received HTTP request is counted and set to the respective paraphrase, the total length HTTP requests. In an embodiment, the total length of the HTTP request is defined by ranges, e.g., 0-99, 100-199, till 390-3999 bytes.

The processes described herein are performed for each HTTP request, transmitted by both client device 120 and the attack tool 125 toward the victim server 130 (as in FIG. 1). The requests can be converted into one or more paraphrases, each of which with a respective paraphrase vector.

As the paraphrases represent the HTTP request structure, and there is a substantial difference between attacker and legitimate client request structure, it is assumed that the paraphrase vector of received HTTP requests should be used for attacker characterization. Requests sent by an attacker, or attackers, can be represented using a relatively small number of paraphrases, and hence paraphrase vectors. That is, the paraphrase vector represents the structure of a request, however multiple different requests can share the same paraphrase, as the actual content of a request is not part of its paraphrase vector. It should be appreciated that using this approach, a large number (e.g., tens of thousands or millions) of attacker distinct HTTP requests are represented as a small set of paraphrases. This small set represents the HTTP requests generated by the attacker, or attackers, (e.g., attack tool 125, FIG. 1), and not by most of legitimate clients as their paraphrase vectors are much more diverse, therefore not repetitive, and are higher in their count.

Returning to FIG. 2A, at S240, the paraphrase vectors, corresponding to the incoming HTTP request, are buffered into an array of paraphrase buffers. The array is a data structure that maintains the overall occurrences of each paraphrase value, for each paraphrase, over the incoming traffic during an attack. The array contains the same paraphrases as defined for a paraphrase vector (e.g., HTTP VERB, Number of path elements in the request URL path, and exists/not exists headers), A paraphrase buffer is a data structure constructed to include values of a single paraphrase. For each possible paraphrase value, the buffer has the actual "value" field along with an "occurrences" field. The occurrences represent the total number of HTTP requests with the specific value that appeared for the specific paraphrase. For each protected entity (e.g., victim server 130, FIG. 1) a single dedicated array is maintained.

Figure 5:
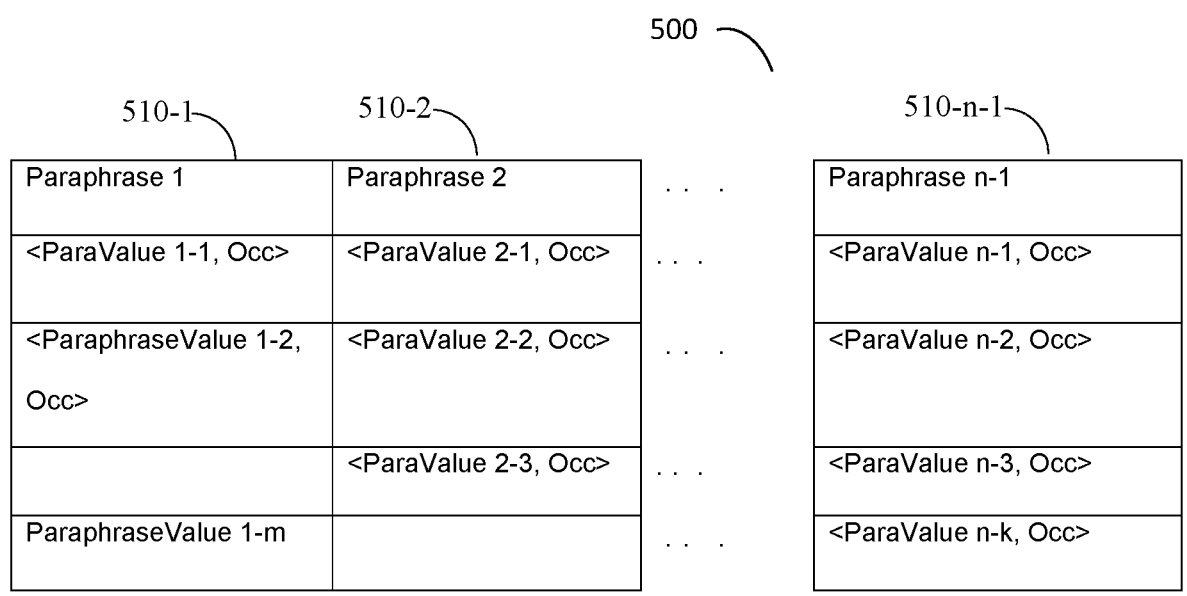
FIG. 5 is an array of paraphrase buffers generated according to an embodiment.

An example array 500 of paraphrase buffers is shown in FIG. 5. The array 500 includes a list of paraphrase buffers 510. Each buffer holds a list of respective paraphrase values and the number of occurrences counted for the same value. Each paraphrase can have a different number of paraphrase values. As an example, if the incoming vectors are aggregated (representing 10 different HTTP requests), and there are 5 vectors with GET method, 4 vectors POST method, and 1 vector with HEAD method, the number of occurrences for the paraphrase values GET POST, and HEAD would be 5, 4, and 1 respectively. In an example embodiment, the possible paraphrase values are pre-defined for each type of paraphrase.

In an embodiment, S240 includes updating each of the respective paraphrase buffer in the array with each received HTTP request. In this embodiment, the vector generated or updated in response to each received HTTP request is scanned and an occurrence count in the paraphrase buffer is incremented by 1 for each corresponding paraphrase value in the scanned vector. By default, the occurrences count is set to zero, and for a first seen paraphrase value the occurrences count is set to one. In an embodiment, the update of the paraphrase buffers is performed at every predefined time window (e.g., 10 seconds) during which the values of the occurrences are incremented based on the requests received during this time value. The time window is referred to as a "characterization window".

At S250, a dynamic applicative signature is generated based on the data across all paraphrase buffers. S250 is performed when there is sufficient data in the buffers (e.g., processing of a predefined number of requests), or when the first learning, or set up, characterization window is terminated.

In an embodiment, the dynamic applicative signature is generated by clustering paraphrase values having the highest occurrence values for each paraphrase buffer in the array of paraphrase buffers. The highest occurrences are determined using a Top on Buffer (ToB). ToB is a vector of paraphrases representing "the most frequent HTTP Requests", and by that the most frequent HTTP requests structure received during the attack. As the attacker and legitimate requests share different request structures; and a rate of attacker's requests rate is higher than a rate of legitimate requests, frequent structures would be from requests generated by the attacker. For each paraphrase, the ToB is built from one or more paraphrase values that are considered as part of the attacker's requests, i.e., by clustering a group of paraphrases resulting from a single attacker. An example diagram illustrating the ToB is provided in FIG. 6B for the paraphrase buffers example illustrated is the example diagram provided in FIG. 6A.

At S260, it is checked if the characterization window has elapsed, and if so, execution continues with S262, where the dynamic applicative signature is output or saved to be further used for the actual characterization. Otherwise, execution returns to S220 where the building of the paraphrase buffers array continues. In some embodiments, it is checked if the number of requests being processed is over a predefined threshold. The check at S260 comes to determine if there is sufficient data to establish an accurate representation of the attacker by the dynamic applicative signature, in the current characterization window. It should be noted that the ToB, and hence the dynamic applicative signature is continuously updated or computed for each characterization window. That is, HTTP requests received during the characterization window are processed to provide an updated signature. In an embodiment, the characterization window is set to a pre-defined time slot of 10 seconds.

At S264, the characterization window is reset, and execution returns to S220 where a new characterization window is initiated, and an updated (or new) applicative signature is generated.

Reference is now made to FIG. 2B where characterization of incoming requests based on the generated dynamic applicative signature is performed during an on-going attack.

At S270, HTTP requests are received. At S272, each incoming request is placed in a paraphrase vector. The operation of S272 is discussed in FIG. 2B. Then, at S274, the dynamic applicative signature generated at S262 (FIG. 2A) is obtained. It should be noted a newly updated signature is obtained at the end of each characterization window.

At S280, each new incoming HTTP request is compared to the generated dynamic applicative signature to check if there is a match. If the incoming HTTP request matches the signature, at S282, the incoming HTTP request is identified as sent by an attacker; otherwise, at S284, the HTTP request is identified as a legitimate request. In an embodiment, S282 may further include relaying the HTTP request to a mitigation resource to apply one or more mitigation actions on the request. A mitigation action may include blocking the request, responding with a blocking page response, reporting and passing the request to the protected entity, and so on. The mitigation resource is provided with the characteristics of the attacker as represented by the dynamic applicative signature. That is, the general structure of HTTP requests generated by the attacker is provided to the mitigation resource. This would allow to define and enforce new mitigation policies and actions against the attacker. Examples of mitigation actions are provided above.

In an embodiment, the mitigation action includes blocking an attack tool at the source when the tool is being repetitively characterized as matched to the dynamic applicative signature. For example, if a client, identified by its IP address or X-Forwarded—For HTTP header, issues a high rate of HTTP requests that match the dynamic applicative signature, this client can be treated as an attacker (or as an attack tool). After a client is identified as an attacker, all future HTTP requests received from the identified attacker are blocked without the need to perform any matching operation to the signature.

In an embodiment, S280 includes matching each paraphrase of the coming request's paraphrase vector, to the corresponding paraphrase values at the ToB. The match strictness can be configured to determine the sensitivity of the method. The sensitivity may affect the false-positive ratio of legitimate requests detected as malicious. The range of a match can be determined in percentage, where 100% would be when all the incoming paraphrase vector's values are the same as the corresponding ToB paraphrase values. This strict match strategy can eliminate the false-positive ratio but might, in some cases, increase the false-negative ratio. To ease the matching requirements, the percentage of matching paraphrase vector's values would be, for example, between 80% and 90% (or match for all paraphrases besides 2 or 3 paraphrases). The matching percentage is a configurable parameter. In an embodiment, the match strictness is defined in terms of the number of allowed un-matched paraphrases.

At S290, it is checked if an end-of-attack signal is received; if so, execution ends, otherwise, execution returns to S270. It should be noted that the paraphrase buffers are updated at every characterization window, thus the comparison at S290 is performed against an updated or a new signature provided at the end of the characterization window. The update of the paraphrase buffers array can be performed as a background process, while new incoming requests (at S210) are received and processed. The characterization of HTTP requests continues as long as the attack is ongoing.

In an embodiment, the process described in FIG. 2 is performed after the completion of the first characterization window, or the characterization setup window.

FIG. 6A shows an example array 600 of paraphrase buffers 610 including some exemplary paraphrases with their respective values and occurrences. FIG. 6B is the ToB of the array 600, demonstrating paraphrases with the highest occurrences values. As can be noticed in FIG. 6B, the ToB includes the paraphrases: GET, Number of Path Elements=0, Num of Query Arguments=2; Number of key:value in Cookie=1, and so on. Thus, from the ToB, the signature of the attacker is deducted. That is, most of the requests generated by the attacker would be demonstrated by the structure reflected by the dynamic applicative signature. Following this example, most of the HTTP requests from the attacker would be with a GET method; 0 number of elements, 2 Query Arguments, and so on. In an embodiment, a ToB is computed by clustering paraphrase values of one or more paraphrases. The clustering allows the inclusion of the ToB, and hence dynamic applicative signatures the paraphrases demonstrate statistical significance in the analyzed requests.

Several advanced HTTP flood attack tools (e.g., 125 in FIG. 1) demonstrate a large set of randomizations to evade fingerprinting, and thus mitigation. As an example, advanced attack tools (e.g., Shapyra) are programmed to randomly decide whether to include certain HTTP headers in each generated request. Alternatively or collectively, such tools can be programmed to randomly decide whether to include query arguments in each request. The actual value of such query arguments can also be randomly decided along with the actual number of such query arguments. Similarly, other headers can be randomized, such as a Cookie HTTP header, a number of key:value element in the cookie, a URL path, and other headers.

It is noted that HTTP flood attacks generated by such an advanced tool result with HTTP requests demonstrating multiple different structures. Therefore, the characterization of such tools would require a dynamic applicative signature that is based on multiple paraphrase values (or simply a "multi-paraphrase signature"). Such multi-paraphrase signature is generated by clustering one or more paraphrase values found for a certain set of paraphrases in the paraphrase buffers array and are assumed as resulted from requests that were originally generated by an attacker. It should be noted that when the attacker generates requests with a single paraphrase value, the multi-paraphrase signature would represent such single value.

Specifically, according to some embodiments, the ToB and hence the multi-paraphrase signature is generated by clustering at least one paraphrase value from each paraphrase in the paraphrase buffers array. The at least one values to be clustered are dynamically determined. When an attack tool generates requests with only a single value (e.g., the attack is directed to the application main page, the number_of_path_elements has the size of 1), the resulting cluster would include a single paraphrase value. As noted above, in an embodiment, the ToB is computed at the end of each characterization window.

Generating a multi-paraphrase signature based on a cluster of values allows for the characterization of attackers' requests containing multiple structures. For such attackers, a signature that is based on a signal paraphrase value would be inefficient. The multi-paraphrase signature allows reducing the rate of false negative and false positive significantly, for such advanced attack tools.

In addition, the multi-paraphrase signature generated using the disclosed clustering method allows eliminating characterization of all buffer's paraphrase values results by the attacker's requests. Further, the disclosed method would ignore cases where specific paraphrases cannot be valuable for characterization. For example, an attacker randomly decides whether to include a Referer HTTP header in each generated request. In such a case, in the paraphrase buffer for the Referer ("exist" or "not exist" type of paraphrase), both paraphrase value occurrences fields resulted from attacker requests (divided evenly). Such paraphrases cannot be used to discriminate legitimate traffic from attack traffic. In an embodiment, paraphrases that all of their values resulted from the attacker's requests, are ineligible for characterization, and thus are not included in the attack signature.

Figure 7:
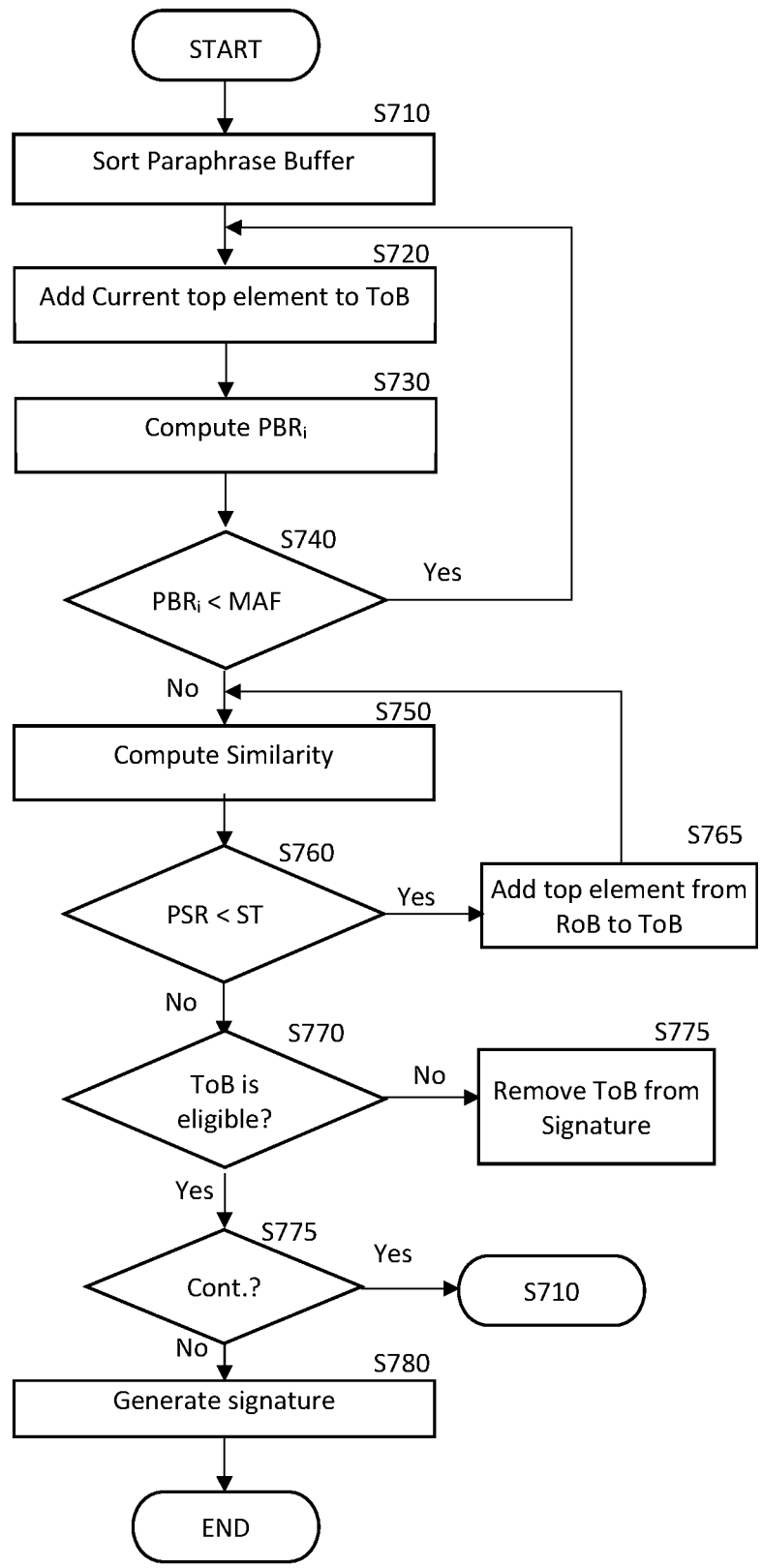
FIG. 7 is a flowchart illustrating cluster of paraphrase values to generate a multi-paraphrase signature characterizing an advanced HTTP flood attack tool according to an embodiment.

FIG. 7 shows an example flowchart 700 illustrating a clustering of paraphrase values to generate a multi-paraphrase signature characterizing an advanced HTTP flood attack tool according to an embodiment. The method operates on an array of paraphrase buffers generated as described in detail above and is performed for each paraphrase buffer in the array of paraphrase buffers.

The characterization of a flood attack traffic is a complex problem as both legitimate and malicious requests are being processed with no way to a-priory distinguish between both cases. That is, the number of occurrences of a paraphrase value may result from both legitimate and malicious requests. The clustering method, disclosed herein, is performed under several heuristics. One heuristic suggests that the ToB total occurrences, or the occurrences resulted by an attacker, is a function of a multiplication of the legitimate total occurrences. The total legitimate occurrences are represented by all paraphrase values occurrences which are not part of the ToB. Another heuristic suggests that the last ToB paraphrase value cannot be similar to the first paraphrase value that is not in the ToB.

The total HTTP requests being processed include legitimate and attacker traffic, and can be represented as follows:

TotalReq=$X+\alpha \cdot X$ where, 'X' is the total legitimate requests. and '$\alpha*X$' is the total attacker requests. The ratio between attacker and legitimate total requests is represented by the attack factor ($\alpha$). In an example embodiment, the actual or real attack factor ($\alpha$) can be a positive number. This attribute is unknown as no baselining over legitimate traffic is performed.

For a specific paraphrase, the attacker's requests result in various paraphrases value occurrences, therefore attacker's requests can be distributed among a number of possible paraphrase values such as:

$$\sum_i a_i \cdot a \cdot X = a \cdot X$$

And similarly for legitimate HTTP requests:

$$\sum_i L_i \cdot X = X$$

where $a_i(a_i<1)$ represents the portion of total attacker traffic a specific paraphrase value presents in the attacker's HTTP requests, and $L_i(L_i<1)$ represents the portion of total legitimate traffic a specific paraphrase value presents in the legitimate client requests. An example for such legitimate and attack paraphrase values distributions is described in FIG. 8.

At S710, each paraphrase buffer in the array of paraphrase buffers is sorted in a descending order based on the occurrences value. An example for an array of paraphrase buffers is shown in FIG. 5. The method is performed for each paraphrase buffer in the array of paraphrase buffers, where at each iteration a paraphrase buffer is selected for processing.

At S720, a paraphrase value with a current highest occurrences value is added to a ToB. As noted above, a ToB may be a data structure that is initially empty and then filled with paraphrase values satisfying certain conditions. Alternatively, a ToB may include paraphrase values satisfying certain conditions.

At S730, a paraphrase buffer ratio (PBR) is computed as a ratio between a total number of occurrences across paraphrase values in the ToB and a total number of occurrences of paraphrase values in the rest of buffer (RoB). That is, $$PBRi = \frac{ToB \text{ Occurrences}}{RoB \text{ Occurrences}}$$

The RoB contains all paraphrase values from the buffer that is not currently in the ToB.

In some embodiments, when clustering paraphrase values with a binary value (exist or not-exist), the ToB includes a paraphrase value (e.g., exist) with the highest occurrences value and the RoB includes the other paraphrase value (e.g., non-exist).

At S740, it is checked if the computed $PBR_i$ is less than a minimum attack factor (MAF). The MAF is assumed to be the minimum multiplication over legitimate traffic that can still be considered a HTTP Flood attack. In an example embodiment, the MAF is a preconfigured value between 3 and 5, which means that attacker traffic is between 3 and 5 times higher than the total legitimate requests. The MAF is used as a replacement for the real attack factor which is not known (as no peace time normal baselining is realized).

If S740 results with a Yes answer, execution continues with S720, where the next paraphrase value with a current highest occurrences value in the paraphrase buffer is added to ToB (and removed from the RoB), then the PBR is computed with new values of the current ToB occurrences and RoB occurrences.

Figure 8:
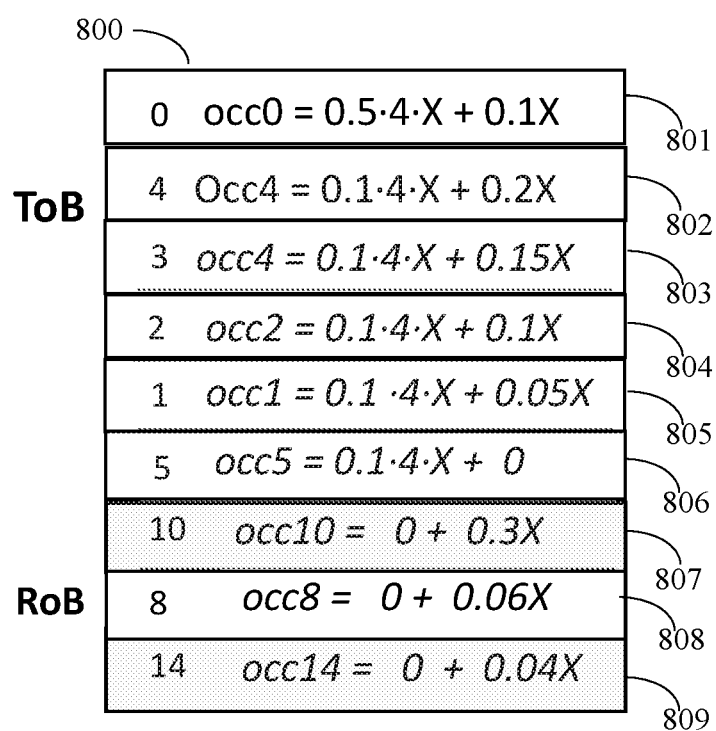
FIG. 8 is an example paraphrase buffer utilized to demonstrate the generation of a multi-paraphrase signature.

Referring to FIG. 8 where an example paraphrase buffer 800 is utilized to explain the loop of S720 through S740. The buffer 800 shows the number of occurrences for the paraphrase value "Alum of key:val in a cookie.". For example, for a paraphrase value '0' the number of occurrences (occ) is occ=0.5·4·X+0.1X, The number '4' is the Real Attack Factor (not known). The number '0.5' is a part of the attacker total requests the current paraphrase value owns. Similarly, the number '0.1' is a part of the total legitimate requests that the current paraphrase value owns.

At the first iteration, the ToB includes element 801 of a paraphrase value '0', and its number of occurrences is denoted by occ0. The RoB, at this stage, includes all elements 802 through 808 of paraphrase values (these values number of occurrences are denoted by occ1, occ2, occ3, occ4, occ5, occ8, occ10, and occ14). The PBR value of the first iteration is computed as follows:

$$PBR_1 = \frac{occ0}{occ4 + occ3 + occ2 + occ1 + occ5 + occ10 + occ8 + occ14}$$

$$PBR_1 = 0.764 < MAF$$

In this example, the MAF value equals 4. Thus, a second iteration takes place, this time with the paraphrase value '4' where the number of occurrences occ4 is added to the ToB (and being removed from RoB) and a second PBR value is computed as follows:

$$PBR_2 = \frac{occ0 + occ4}{occ3 + occ2 + occ1 + occ5 + occ10 + occ8 + occ14}$$

$$PBR_2 = 1.222 < MAF$$

As $PBR_2$ value is less than MAF, another iteration is performed. This process is continued until the last computed PBR is higher than the MAF. In this example, $PRB_5$ meets the condition:

$$PBR_3 = \frac{occ0 + occ4 + occ3}{occ2 + occ1 + occ5 + occ10 + occ8 + occ14}$$

$$PBR_3 = 1.926 < MAF$$

$$PBR_4 = \frac{occ0 + occ4 + occ3 + occ2}{occ1 + occ5 + occ10 + occ8 + occ14}$$

$$PBR_4 = 3.13 < MAF$$

$$PBR_5 = \frac{occ0 + occ4 + occ3 + occ2 + occ1}{occ5 + occ10 + occ8 + occ14}$$

$$PBR_5 = 5.656 > MAF$$

Returning to FIG. 7. If S740 results with a 'No' answer, i.e., the last computed PBR value is higher than the MAF; execution continues with S750.

At S750, a similarity between a last element (paraphrase's occurrences value) in the current ToB to the first element in a current RoB is determined. Referring to the example shown in FIG. 8, the similarity between adjacent elements 805 (occ1) and 806 (occ5) are determined.

To this end, in an embodiment, first a paraphrase similarity ratio (PSR) is computed as the ratio between the number of occurrences of two adjacent paraphrase values in the buffer. That is:

$$PSR = \frac{\text{Paraphrase value } (i) \text{ occurrences}}{\text{Paraphrase value } (i+1) \text{ occurrences}}$$

where T is the location in the sorted buffer (e.g., elements 806 and 807, in FIG. 8). As such, the PSR is a measure of the level of similarity between two adjacent paraphrase values within a specific paraphrase in the paraphrase buffers array.

At S760, it is checked if the current computed PSR value is less than the similarity threshold set based on the minimum attack factor (MAF). In an embodiment, the similarity threshold (ST) is set to:

$$ST = 1 + \frac{1}{1 + MAF}$$

In one example embodiment, two adjacent paraphrases are similar if there is approximately around 20-25% difference in their ratio. In an embodiment, the similarity test is made following the second heuristic presented above.

If S760 results with a 'Yes' answer, execution continues to S765 where the first element in the RoB (e.g., 806, FIG. 8) is added to the ToB. Then, execution returns to S750. Otherwise, execution continues with S770.

Referring to FIG. 8 where the example buffer 800 is utilized to explain the loop S760 through S770. First, a PSR; is computed for the elements 805 and 806 corresponding to occ1 and occ5 and compared the similarity threshold equaling 1.2. That is:

$$PSR_1 = \frac{occ1}{occ5} = 1.16 < 1.2$$

In this example, the similarity threshold (ST) value is 1.2. As the elements are considered similar, the paraphrase value of occ5 is added to the ToB. Then, a $PSR_2$ is computed with the elements (806 and 807) corresponding to occ5 and occ10 and compared to the similarity threshold. Here, the $PSR_2$ is:

$$PSR_2 = \frac{occ5}{occ10} = 1.33 > 1.2$$

As there is no similarity between occ5 and occ10, the ToB is determined to include all elements labeled 801 through 806 in FIG. 8.

Returning back to FIG. 7. At S770, it is determined whether the ToB is eligible to be utilized as a part of the multi-paraphrase signature. In an embodiment, S770 includes checking the number of paraphrase values (elements) in the ToB and RoB as determined at the conclusion of S765. If the number of elements in ToB includes all paraphrase values in the buffer and the RoB are empty, the ToB is determined ineligible for characterization. In an embodiment, a paraphrase which is marked as not eligible for characterization is removed, or excluded, from the actual multi-paraphrase signature.

In some embodiments, when clustering paraphrase values with a binary value (exist or not-exist), a buffer (with a paraphrase value having the highest occurrences value as the ToB) is eligible for characterization when the PBR is equal to or greater than the MAF. Otherwise, the paraphrase is ineligible for characterization and cannot be used as part of the signature.

It should be noted that if S770 results with a 'No' answer, the computed ToB for this buffer is excluded from the multi-paraphrase signature and cannon be used for the actual attacker characterization.

At S775, it is checked if all paraphrase buffers in the array have been processed, and if so, execution continues with S780. Otherwise, execution returns to S710 to process a new paraphrase buffer from the array.

At S780, the multi-paraphrase signature is generated by clustering all paraphrase values in the ToB generated by processing all paraphrases in the array of paraphrase buffers. As noted above, only eligible paraphrases are included in the ToB. For example, the signature generated from the paraphrase buffer shown in FIG. 8 would include for the paraphrase "Num of key:val in a Cookie" the values '0', '4', '3', '2', '1, and '5'. It should be noted that this example relates only to a single paraphrase buffer, but shows a number of paraphrase values that can be included in an attacker's requests.

The generated signature can be utilized to characterize new requests as discussed with reference to FIG. 2B. Further, it should be noted that a new signature is updated or computed for each characterization window. That is, HTTP requests received during the characterization window are processed to provide a new signature at every itineration.

Figure 9:
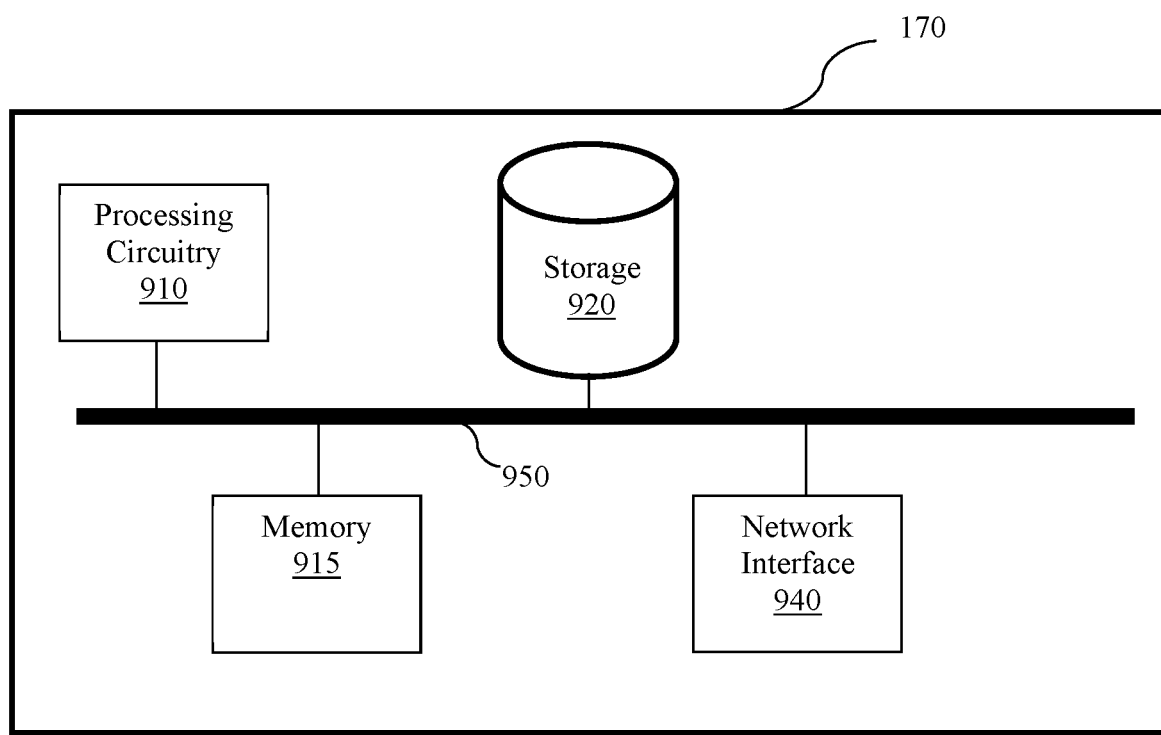
FIG. 9 is a block diagram of a device utilized to carry the disclosed embodiments.

FIG. 9 is an example block diagram of the device 170 implemented according to an embodiment. The defense system 170 includes a processing circuitry 810 coupled to a memory 915, a storage 920, and a network interface 940. In another embodiment, the components of the device 170 may be communicatively connected via a bus 950.

The processing circuitry 910 may be realized as one or more hardware logic components and circuits. For example, and without limitation, illustrative types of hardware logic components that can be used include field-programmable gate arrays (FPGAs), application-specific integrated circuits (ASICs), Application-specific standard products (ASSPs), system-on-a-chip systems (SOCs), general-purpose microprocessors, microcontrollers, digital signal processors (DSPs), and the like, or any other hardware logic components that can perform calculations or other manipulations of information.

The memory 915 may be volatile (e.g., RAM, etc.), non-volatile (e.g., ROM, flash memory, etc.), or a combination thereof. In one configuration, computer-readable instructions to implement one or more embodiments disclosed herein may be stored in storage 920.

In another embodiment, the memory 915 is configured to store software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing circuitry 910 to perform the various processes described herein. Specifically, the instructions, when executed, cause the processing circuitry 910 to perform the embodiments described herein.

The storage 920 may be magnetic storage, optical storage, and the like, and may be realized, for example, as flash memory or other memory technology; CD-ROM, Digital Versatile Disks (DVDs), or any other medium which can be used to store the desired information.

The processing circuitry 910 is configured to perform the various embodiments as described herein.

The network interface 940 allows the device to communicate at least with the servers and clients. It should be understood that the embodiments described herein are not limited to the specific architecture illustrated in FIG. 9, and other architectures may be equally used without departing from the scope of the disclosed embodiments. Further, the system 110 can be structured using the arrangement shown in FIG. 9.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer-readable medium is any computer-readable medium except for a transitory propagating signal.

All examples and conditional language recited herein are intended for pedagogical purposes to aid the reader in understanding the principles of the disclosed embodiment and the concepts contributed by the inventor to furthering the art and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

It should be understood that any reference to an element herein using a designation such as "first," "second," and so forth does not generally limit the quantity or order of those elements. Rather, these designations are generally used herein as a convenient method of distinguishing between two or more elements or instances of an element, Thus, a reference to first and second elements does not mean that only two elements may be employed there or that the first element must precede the second element in some manner. Also, unless stated otherwise, a set of elements comprises one or more elements.

What is claimed is:

1. A method for characterizing application layer flood denial-of-service (DDoS) attacks, comprising:
receiving an indication on an on-going DDoS attack directed to a protected entity;
generating a dynamic applicative signature by analyzing requests received during the on-going DDoS attack, wherein generating the dynamic applicative signature includes, at an end of a characterization window, determining a top of buffer values of each paraphrase in an array of paraphrase buffers, wherein the dynamic applicative signature is the top of buffer across all paraphrases in the array, wherein the dynamic applicative signature characterizes requests generated by an attack tool executing the on-going DDoS attack;
characterizing each incoming request based on the generated dynamic applicative signature, wherein the characterization provides an indication for each incoming request whether a request is generated by the attack tool;
and generating a multi-paraphrase signature characterizing the attack tool by clustering at least one value of a plurality of different attributes of the received requests.

2. The method of claim 1, wherein generating the dynamic applicative signature further comprises:
for each request received during the characterization window:
updating a paraphrase vector with paraphrases and values of the paraphrases representing attributes in the request;
updating a paraphrase buffer with values of paraphrases in the designated paraphrase vector, wherein the paraphrase buffer is part of an array of paraphrase buffers; and
at the end of the characterization window, determining a top of buffer values of each paraphrase across all the paraphrase buffers in the array, wherein the dynamic applicative signature is the top of buffer across all paraphrases in the array.

3. The method of claim 2, wherein the paraphrase vector is a data structure representing attributes in the respective received request.

4. The method of claim 3, wherein the received requests are HTTP requests, and wherein updating the paraphrase vector further comprises:
parsing each of the received requests to identify HTTP headers;
extracting a value of a HTTP method field from the parsed request;

counting a number of path elements from a URL path designated in the parsed request;

identifying and counting known HTTP headers in the parsed request; and identifying and counting unknown HTTP headers in the parsed request;

identifying and counting the number of cookie key values in cookie HTTP header;

identifying and counting the number of query arguments in the URL;

identifying the total length in bytes of the request;

identifying the length of User Agent HTTP header; and populating a data structure of the paraphrase vector with the HTTP method's field, the number of path elements, the number of known HTTP headers;

the number of unknown HTTP headers, the number of key values in cookie header, the number of query argument in URL, the length of the request, and the length of User Agent header.

5. The method of claim 2, wherein the paraphrase buffer contains, for each paraphrase, an occurrence value indicating a number of aggregated occurrences of the respective paraphrase value appeared in the received requests.

6. The method of claim 1, wherein determining the top of buffer further comprising:

ordering paraphrases in each paraphrase buffer base on their respective occurrences values; and selecting the paraphrase value having the highest occurrences value as the top of buffer.

7. The method of claim 1, wherein characterizing each incoming request based on the dynamic applicative signature further comprises:

converting the received incoming request into a paraphrase vector;

comparing the paraphrase vector to the dynamic applicative signature;

determining the received incoming request is a legitimate request when the paraphrase vector does not match the dynamic applicative signature; and determining the received incoming request is generated by the attack tool when the paraphrase vector matches the dynamic applicative signature.

8. The method of claim 7, wherein the match is determined based on a number of matching paraphrases between the paraphrase vector of the received incoming request and the dynamic applicative signature.

9. The method of claim 8, further comprising:

setting a number of matching paraphrases for a match based on a determined false positive rate.

10. The method of claim 1, further comprising:

generating a policy to mitigate the attack tool, based on the dynamic applicative signature; and providing the policy to a mitigation resource to perform at least one mitigation action on requests determined to be generated by the attack tool.

11. The method of claim 10, wherein the at least one mitigation action includes blocking the attack tool.

12. The method of claim 10, further comprising:

determining an attack tool being repetitively characterized by the dynamic applicative signature;

identifying a source address of the attack tool; and blocking the attack tool at the source address without further characterization.

13. The method of claim 1, wherein the DDoS attack is an HTTP Flood attack, and the attacker carries the attack using an HTTP Flood attack tool, wherein the HTTP Flood attack tool generates HTTP requests having legitimate structure and content.

14. The method of claim 1, wherein the requests generated by an attacker are structured to include pseudo-random values.

15. The method of claim 1, wherein the method is performed by any one of: a DDoS mitigation device, a Web Application Firewall (WAF) device, a web server, and a web proxy.

16. A non-transitory computer readable medium having stored thereon instructions for causing a processing circuitry to execute a process, the process comprising:

receiving an indication on an on-going DDoS attack directed to a protected entity;

generating a dynamic applicative signature by analyzing requests received during the on-going DDoS attack, wherein generating the dynamic applicative signature includes, at an end of a characterization window, determining a top of buffer values of each paraphrase in an array of paraphrase buffers, wherein the dynamic applicative signature is the top of buffer across all paraphrases in the array, wherein the dynamic applicative signature characterizes requests generated by an attack tool executing the on-going DDoS attack;

characterizing each incoming request based on the generated dynamic applicative signature, wherein the characterization provides an indication for each incoming request whether a request is generated by the attack tool; and generating a multi-paraphrase signature characterizing the attack tool by clustering at least one value of a plurality of different attributes of the received requests.

17. A system for characterizing application layer flood denial-of-service (DDoS) attacks, comprising:

a processing circuitry; and a memory, the memory containing instructions that, when executed by the processing circuitry, configure the system to:

receive an indication on an on-going DDoS attack directed to a protected entity;

generate a dynamic applicative signature by analyzing requests received during the on-going DDoS attack, by at an end of a characterization window, determining a top of buffer values of each paraphrase in an array of paraphrase buffers, wherein the dynamic applicative signature is the top of buffer across all paraphrases in the array, wherein the dynamic applicative signature characterizes requests generated by an attack tool executing the on-going DDoS attack;

characterize each incoming request based on the generated dynamic applicative signature, wherein the characterization provides an indication for each incoming request whether a request is generated by the attack tool;

and generate a multi-paraphrase signature characterizing the attack tool by clustering at least one value of a plurality of different attributes of the received requests.

18. The system of claim 17, wherein the system is further configured to:

for each request received during a characterization window:

update a paraphrase vector with paraphrases and values of the paraphrases representing attributes in the request;

update a paraphrase buffer with values of paraphrases in the designated paraphrase vector, wherein the paraphrase buffer is part of an array of paraphrase buffers; and at the end of the characterization window, determine a top of buffer values of each paraphrase across all the paraphrase buffers in the array, wherein the dynamic applicative signature is the top of buffer across all paraphrases in the array.

19. The system of claim 18, wherein the paraphrase vector is a data structure representing attributes in the respective received request.

20. The system of claim 19, wherein the received requests are HTTP requests, and wherein updating the paraphrase vector further comprises:

parse each of the received requests to identify HTTP headers;

extract a value of a HTTP method field from the parsed request;

count a number of path elements from a URL path designated in the parsed request;

identify and counting known HTTP headers in the parsed request; and identify and counting unknown HTTP headers in the parsed request;

identify and counting the number of cookie key values in cookie HTTP header;

identify and counting the number of query arguments in the URL;

identifying the total length in bytes of the request;

identify the length of User Agent HTTP header; and populate a data structure of the paraphrase vector with the HTTP method's field, the number of path elements, the number of known HTTP headers;

the number of unknown HTTP headers, the number of key values in cookie header, the number of query argument in URL, the length of the request, and the length of User Agent header.

21. The system of claim 18, wherein the paraphrase buffer contains, for each paraphrase, an occurrence value indicating a number of aggregated occurrences of the respective paraphrase value appeared in the received requests.

22. The system of claim 18, wherein the system is further configured to:

order paraphrases in each paraphrase buffer base on their respective occurrences values; and select the paraphrase value having the highest occurrences value as the top of buffer.

23. The system of claim 17, wherein the system is further configured to:

convert the received incoming request into a paraphrase vector;

compare the paraphrase vector to the dynamic applicative signature;

determine the received incoming request is a legitimate request when the paraphrase vector does not match the dynamic applicative signature; and determine the received incoming request is generated by the attack tool when the paraphrase vector matches the dynamic applicative signature.

24. The system of claim 23, wherein the match is determined based on a number of matching paraphrases between the paraphrase vector of the received incoming request and the dynamic applicative signature.

25. The system of claim 24, wherein the system is further configured to:

setting a number of matching paraphrases for a match based on a determined false positive rate.

26. The system of claim 17, wherein the system is further configured to:

generate a policy to mitigate the attack tool, based on the dynamic applicative signature; and provide the policy to a mitigation resource to perform at least one mitigation action on requests determined to be generated by the attack tool.

27. The system of claim 26, wherein the at least one mitigation action includes blocking the attack tool.

28. The system of claim 26, wherein the system is further configured to:

determine an attack tool being repetitively characterized by the dynamic applicative signature;

identify a source address of the attack tool; and block the attack tool at the source address without further characterization.

29. The system of claim 17, wherein the DDoS attack is an HTTP Flood attack, and the attacker carries the attack using an HTTP Flood attack tool, wherein the HTTP Flood attack tool generates HTTP requests having legitimate structure and content.

30. The system of claim 17, wherein the requests generated by an attacker are structured to include pseudo-random values.

31. The system of claim 17, wherein the system is performed by any one of: a DDoS mitigation device, a Web Application Firewall (WAF) device, a web server, and a web proxy.

\* \* \* \* \*